3,686,030
WIRE CONDUCTOR HAVING A RESIN COATING MODIFIED WITH AMINE-SILICONE REACTION PRODUCT
Jerome A. Preston, Fort Wayne, Ind., assignor to Essex International, Inc.
No Drawing. Filed June 29, 1970, Ser. No. 50,978
Int. Cl. B44d 1/42
U.S. Cl. 117—232                     4 Claims

ABSTRACT OF THE DISCLOSURE

Amine-modified siloxanes are added to wire conductor insulating coatings, i.e., solutions of nylon, polyethylene terephthalate and polytrimellitamide, to reduce the coefficient of friction of the cured coating. The coatings of the invention adhere to conventional enamels and may be used under or over such enamels. Upon heating, the ingredients in the deposited coating react or interreact to produce hard, slippery surfaces.

---

This invention relates to an improved magnet wire having a coating characterized by a low coefficient of friction.

It is an object of the present invention to provide magnet wire which requires no oil for winding, that is the coefficient of friction of the coating is so low that it can be wound at high speeds without pretreatment of any kind. The wire of this invention has a slippery, uniformly deposited, dry surface which makes high speed winding possible, but the slick nature of the surface does not prevent overcoating or adhesion of other coatings. Coils wound with this magnet wire may be taped, or sprayed or dipped in enamel, varnish or paint since these materials adhere to the slippery coating of the invention. If oil is used, it must be removed before taping or spraying, etc.

Nylon insulations have long been recognized by the magnet wire industry as the most windable films available, due to their slick surfaces and consequent ability to nest into allotted winding spaces. The modified resin coatings of the invention, however, consistently outperform the nylon types based on tests of the two types on high speed automatic winding equipment, and in laboratory controlled coefficient of friction tests. The coatings of the invention constitute a 20% improvement in coefficient of friction compared with nylon and about 90% compared with other common films. For nylon overcoated insulations, the coefficient of friction is 0.17, compared with up to 0.33 for other commonly used films. The coefficient of the coatings of the invention consistently measures 0.14 or below.

Magnet wire base coats and topcoats modified with a variety of silicones were disclosed previously. While these are satisfactory, several of the solvent systems used were not able to dissolve the silicone co-reactants along with the film former resin used. Therefore, it was necessary to make dispersions of the topcoats and base coats used. It was noticed that in those systems where the silicone was soluble the life of the mixture was greater than 30 days, but in the case of dispersions, it was usually under 3 days. Therefore, dispersions of silicone film former enamels have to be used as soon as possible after preparation. The silicones of this invention were found to be soluble in the solvent systems where some commercially available usable silicones were found to be insoluble.

The objects of the invention are accomplished by reacting a silicone with pyrrolidone or vinyl pyrrolidone and adding the reaction product in an amount ranging from .02 to 20% by volume to a solution of polytrimellitamide, nylon or polyethylene terephthalate. The amine-modified silicones are soluble in solvents like N-methyl pyrrolidone commonly used for polytrimellitamide resins. They are also soluble in cyclohexanone, cresylic acid, E. W. naphtha and xylene.

The modified silicone may be prepared by copolymerization and hydrolysis of a reactive chlorosilane and a reactive pyrrolidone in the presence of a suitable catalyst; or alternatively by graft copolymerization of the amine to a polysiloxane polymer chain having reactive sites. Suitable silanes are as follows: diphenyldichlorosilane; dimethyldichlorosilane; diethyldichlorosilane; divinyldichlorosilane; dichlorophenyltrichlorosilane; trichlorosilane; vinyltrichlorosilane; chloropropyltrimethoxy silane; amino propyltriethoxy silane. Suitable polysiloxanes are as follows:

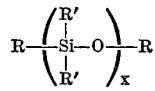

where

R = an organic group with some unsaturation, having 2–22 carbon atoms, H, OH, COOH, COOR with R an alkyl.
R' = a monovalent hydrocarbon radical
X = 2 to 20;

or where

R = a monovalent hydrocarbon radical
X = 2 to 20 or more
R' = an organic group with some unsaturation, having 2–22 carbon atoms, H, OH, COOH, COOR with R an alkyl.

The following catalysts may be used: hydrogen peroxide; benzoyl peroxide; bis (2,4-dichloro)benzoyl peroxide; ditertiary butyl peroxide; dicumyl peroxide; t-butyl perbenzoate; 2,5 bis(t-butyl peroxy) 2,5 dimethyl hexane; chloroplatinic acid; platinum.

The modified silicones and their method of preparation are described in Bailey et al. 2,820,798 incorporated herein by reference.

The following examples are illustrative of our invention.

EXAMPLE 1

1000 grams of distilled water chilled to 8° C., 260 grams of dimethyl dichloro silane and 16 grams of trimethyl chlorosilane were charged into a suitable reaction vessel and stirred at room temperature until polymer formed. Sodium bicarbonate was added to neutralize the HCl and the fluid polymer was decanted to another clean reaction vessel containing 440 grams of N-vinyl-2-pyrrolidone and .6 gram of dicumyl peroxide catalyst was added. The temperature was raised to 140° C. and kept constant for 60 minutes. The resultant amine-siloxane product was allowed to cool.

10 grams of the product were dissolved in 100 grams of n-methyl pyrrolidone and added to 1000 grams of a 25% solution of polytrimellitamide CAI 537 made by Amoco Chemical Co. Inc., Chicago, Ill., and described in Pat. 3,320,202). This combination was then mixed for 15 minutes at high speed. The resulting liquid was clear and single phase.

This solution was applied as a topcoat over four base coats of a class H polyester enamel on 18 gauge copper wire and baked at 450° F. Two coats were applied. The resultant magnet wire had a coefficient of friction of .121.

EXAMPLE 2

2000 grams of a methyl octyl fluid silicone and 1400 grams of N-vinyl-2-pyrrolidone were added to a suitable reaction vessel. The temperature was raised to 140° C. with mixer operating and a blanket of inert gas covering the surface. 30 grams of benzoyl peroxide were added and the cook continued for one hour. The resultant fluid was found to be soluble in N-methyl pyrrolidone and was added to the amideimide polymer solution to provide a wire enamel, as in Example 1. Magnet wire having a coating deposited from said solution and baked had a coefficient of friction of .116.

EXAMPLE 3

The procedure of Example 2 was followed using methyl docosane fluid silicone substituted for the methyl octyl silicone. The wire product coated with this material had a coefficient of friction of .127.

EXAMPLE 4

Example 2 was repeated using a methyl alkyl polysiloxane having 22 carbon atoms in the alkyl group. Magnet wire coated with this material had a coefficient of friction of .131.

EXAMPLE 3

590 grams of a methyl hydrogen polysiloxane were placed in a suitable kettle as in Example 1 and 478 grams of N-vinyl-2-pyrrolidone were added. Temperature was raised to 140° C. and 6 grams of ditertiary butyl peroxide were added. The cook was continued for one hour. The resulting fluid was then added as 1% of the volume to a topcoat as in Example 1 and wire coated therewith. The resultant magnet wire had a coefficient of friction of .121.

EXAMPLE 6

250 grams of 2-pyrrolidone were mixed with 310 grams of methyl octyl fluid silicone. 7 grams of 2,5 bis (t-butyl peroxy) 2,5 dimethyl hexane were added to the mixture as a catalyst and the temperature raised to 140° C. and held for 30 minutes. The resulting fluid was then added to a solution of polyamide-imide resin as in Example 1. Wire coated with the product had a coefficient of friction of .131.

EXAMPLE 7 (NOT THE INVENTION)

Wire coated with polyester enamel (Class H) base coat and a polyamide-imide topcoat (without the resin of the invention) had a coefficient of friction of .347.

EXAMPLE 8

2000 grams of a methyl vinyl polysiloxane fluid were put in a suitable vessel containing 3100 grams of 2-pyrrolidone. The temperature was raised to 140° C. and 15 grams of ditertiary butyl peroxide were added and cooked for 1 hour. The resultant fluid was added in the amount of 1% by volume to a 16% solution of nylon 6, 6 in a solvent blend of 80 parts cresylic acid and 20 parts of E. W. naphtha. This mixture was applied to copper wire as a topcoat and after baking, the wire had a coefficient of friction of .116.

EXAMPLE 9

204 grams of a copolymer of dimethyl polysiloxane and polyoxy alkylene ether and 200 grams of 2-pyrrolidone were added to a reaction flask. 1.3 grams of benzoyl peroxide were added and the temperature raised to 150° C. and held for one hour. The resultant product was added in the amount of one-half percent by volume to the nylon enamel topcoat solution mentioned in Example 8. The solution was clear. 18 gauge aluminum wire was coated with four coats of a class 155° C. Nema polyester enamel (P. D. George 920 enamel) and then topcoated with two coats of the modified nylon topcoat enamel. The coefficient of friction was .116.

What is claimed is:

1. A metal conductor having a slippery, hard insulating coating which comprises a polymer selected from the group consisting of nylon, polyethylene terephthalate and a polyamide-imide and a copolymer of methyl siloxane and a nitrogen compound selected from the group consisting of pyrrolidone and N-vinyl pyrrolidone, said coating having a coefficient of friction of 0.14 or below.

2. The conductor of claim 1 in which said siloxane is methyl vinyl polysiloxane.

3. The conductor of claim 1 in which said siloxane is selected from the group consisting of a fluid methyl octyl silicone, a fluid methyl docosane siloxane, methyl hydrogen polysiloxane and a copolymer of dimethyl polysiloxane and polyoxyalkylene ether.

4. A metal conductor having a slippery, hard insulating coating consisting essentially of the heat reaction product of polytrimellitamide and a copolymer of methyl vinyl polysiloxane and N-vinyl pyrrolidone, said coating having a coefficient of friction of 0.14 or below.

References Cited

UNITED STATES PATENTS

| | | | |
|---|---|---|---|
| 3,320,202 | 5/1967 | Bolton et al. | 260—30.2 |
| 3,451,848 | 6/1969 | Stephens | 117—218 X |
| 2,820,798 | 1/1958 | Bailey et al. | 260—326.5 |
| 2,983,700 | 5/1961 | Rohm | 117—161 X |

WILLIAM D. MARTIN, Primary Examiner

B. D. PIANALTO, Assistant Examiner

U.S. Cl. X.R.

117—75, 128.4, 161 P, 161 UN, 161 ZA, 218, 234; 260—824 R